Nov. 11, 1969 T. A. BANNING, JR 3,478,162

DUAL QUALITY SUBSCRIPTION TELEVISION SYSTEM

Filed Sept. 27, 1965 3 Sheets-Sheet 1

Inventor:

Thos. A. Banning Jr.

Nov. 11, 1969 T. A. BANNING, JR 3,478,162

DUAL QUALITY SUBSCRIPTION TELEVISION SYSTEM

Filed Sept. 27, 1965 3 Sheets-Sheet 2

Inventor:

Nov. 11, 1969 T. A. BANNING, JR 3,478,162

DUAL QUALITY SUBSCRIPTION TELEVISION SYSTEM

Filed Sept. 27, 1965 3 Sheets-Sheet 3

Inventor:

Thos. A. Banning Jr.

United States Patent Office 3,478,162

Patented Nov. 11, 1969

3,478,162

DUAL QUALITY SUBSCRIPTION TELEVISION SYSTEM

Thomas A. Banning, Jr., 5500–5520 S. Shore Drive, Apt. 1408, Chicago, Ill. 60637

Continuation-in-part of application Ser. No. 459,399, May 27, 1965. This application Sept. 27, 1965, Ser. No. 490,402

Int. Cl. H04m 7/06

U.S. Cl. 178—5.6 39 Claims

ABSTRACT OF THE DISCLOSURE

This case discloses a television system adapted to use in highly congested areas, where wired operations may be economically installed, e.g., large hotels, and similar installations. Various signalling provisions are provided for informing the attendant controlling the operations, as to the desires of the operator of each receiver; with provision for reception of broadcast renditions of the program, free; the broadcast renditions being of the inferior aesthetic quality—the wired transmission renditions being of superior aesthetic quality, requiring pay or subscription.

This application is a continuation-in-part of my copending application, Ser. No. 459,399 filed May 27, 1965, allowed Aug. 25, 1967, and which became Letters Patent No. 3,365,542, issued Jan. 23, 1968.

This invention relates to improvements in pre-pay or subscription television, and the like. Broadly stated the improvements herein disclosed relate to that general system of television transmission and reception and translation, wherein the operations are conducted in such manner that the person receiving the program may, either by his own operations, or under his instruction or desire as expressed to another, receive and interpret the incoming and translate program in either of at least two aesthetic qualities, each of which is a fully intelligible translation of the emitted program, such a selection of the desired aesthetic quality by the receiver, and various means to enable the receiver to select and produce the desired aesthetic quality of reception and translation, are disclosed in various letters patent of the United States, issued to me, and various pending applications filed by me, but as yet unissued, including Patents Nos. 2,755,334, filed July 9, 1951, issued July 17, 1956; 3,070,652, filed July 16, 1956, issued Dec. 25, 1962; 3,222,452, July 16, 1956, issued Dec. 7, 1965; 3,310,624, filed Aug. 28, 1963, issued Mar. 21, 1967; 3,330,906, filed July 16, 1956, issued July 11, 1967; 3,336,439 filed July 16, 1956, issued Aug. 15, 1967; and 3,358,079, filed Aug. 2, 1963, issued Dec. 12, 1967; as well as the aforesaid Ser. No. 459,399, filed May 27, 1965, issued Jan. 23, 1968; and various other pending applications.

Such earlier applications and patents also disclose means to enable the receiver to receive and intelligibly translate one of the aesthetic quality translations without pre-pay or subscription operation (usually the less or lower aesthetic quality reception and translation), with provisions such that the other or better aesthetic quality reception and translation may be received and perceived by the viewer, only when pre-pay or subscription operation has been made. Numerous embodiments of structures and equipment whereby such selection of quality of translation may be made, are included in my earlier filed and still pending or issued applications for U.S. Letters Patent. These include the following pairs of translation: monochrome (inferior) vs. color (superior); negative picture translation (inferior) vs. positive picture translation (superior); wrong color translation (inferior) vs.

correct color translation (superior); commercials included (inferior) vs. commercials excluded (superior); upside down picture translation (inferior) vs. right-side-up picture translation (superior); audio excluded (inferior) vs. audio included (superior); interfering sound in audio (inferior) vs. no interfering sound in audio (superior); video excluded (inferior) vs. video included (superior); and two dimensional picture translation (inferior) vs. three dimensional picture translation (superior).

Included in one or more of such earlier cases I have disclosed systems and arrangements whereby the pre-pay or subscription receiver installations which are included in an areal zone may be served from a control station with operator, stationed in or for such zone, various such areal zones being defined for a city or developed suburban area, highly populated. Such an arrangement, in addition to enabling the attendant to perform such operations as may be needed in connection with the controls of the television receivers, will also facilitate the keeping of records of the use of each receiver, defining whether such use is a free use or a pay or subscription use. The disclosures of the present application relate, among other things generally to arrangements which include such control stations or, in some cases, a single control station, serving numerous subscribers to the service. In the following disclosures I have included various signalling elements constituted to facilitate the information delivered to the attendant at the control station, as well as to give the user of the receiver information needed for him to make his choice of reception.

A special type of such control station exists in the case of a large hotel, a motel of size, and similar groups of places of residence, either transient or permanent, or combinations of such classes of residents. In the case of such an installation it is the almost universal practice to handle the numerous telephone calls to and from residents, through a common switchboard or a number of such switchboards, with operators constantly in attendance to answer and complete calls. It is one feature of the present invention to provide a convenient switchboard or plurality of switchboards (as in the case of a large hotel or motel installation) close to or adjacent to the conventional telephone switchboard installation, which switchboard or switchboards shall be readily accessible to the conventional switchboard or switchboards and to the conventional telephone operator. Such specially provided switchboard or switchboards will provide for the purpose of handling the needs of guests desiring to avail themselves of the facilities of my present system of choice of aesthetic quality of one or more of the programs available at any given time. The arrangements to be hereinafter described include provisions for producing the following operations, among others:

A "Pay" or "Subscriber" receiver is installed in each of the rooms or apartments to be served, such receiver including the following operational elements, either as a part of such receiver or corresponding to such receiver; means constituted to enable reception of the radio frequency signals for the program, over either of two distinct carrier paths. Such two paths may be, by way of example, over the air by conventional broadcast in the one case, and by way of co-axial cable or other path non-accessible to conventional receivers, in the other case. Such "Pay" or "Subscriber" receiver will also include, either as a part thereof or supplemental thereto, means constituted to cause the radio frequency input connection of the receiver to be normally in a first defined radio frequency receiving connection with one of the incoming sets of radio frequency signals (e.g., that signal which is emitted broadcast over the air), together with means operable by the control station attendant, constituted to cause the radio frequency input connection of the receiver to shift from said first defined connection, into a second defined connection to the radio frequency signals arriving by way of the path which is non-accessible to the conventional or non-pay receivers (not "Pre-Pay" or "Subscriber"). Thereby the receiver in question may be caused to receive either of two renditions of the program being supplied by the sending station to which such receiver is then tuned.

The sending station is provided with means to emit the signals for the body or corpus of the program being produced at the time in question, in either of two rendition qualities at the same time—during the time allotment for the program in question. One such rendition may be in monochrome, and the other may be in color signals. When the monochrome rendition is emitted by broadcasting over the air it is evident that a conventional receiver, whether of monochrome structure or color translating structure, may receive and translate such monochrome emitted rendition in monochrome; and, if the "Pay" receiver be at the time in its condition for reception of the broadcast signals through its first defined radio reception may be intended by conventional non-pay receiver may also receive such rendition in monochrome. If the rendition of a conventional or non-pay program be by broadcasting over the air and be produced by color signals, and if such conventional non-pay receiver be a color receiver, it may receive such color emitted conventional program non-pay rendition in color; but if such conventional receiver be a monochrome receiver, it may also receive such color signal emitted and broadcast rendition in monochrome, being a compatible receiver. It is noted also, that when the "Pay" receiver is a color receiver it may receive and translate such color emitted signals rendition in color from over the air, when the radio frequency signal input connection is in the first defined switch position, being a connection to a suitable receiving antenna.

The operations thus far defined constitute use of the broadcasting antenna of the sending station for either a monochrome rendition or a color rendition of a "conventional" non-pay program—that is, a program for which reception may be intended by conventional non-pay receivers, as well as "Pay" receivers; but in either case, without need of pre-pay or subscription operation.

At this point it is noted that the hereinafter described structures include a manually operated element which is included in the circuitry between the radio frequency antenna of the "Pay" receiver and the radio frequency input connection of that receiver; such element constituting a switch, which when open serves to prevent delivery of the radio frequency signals arriving over the air, to the input of such "Pay" receiver. Thus such receiver may, on occasion be completely cut-off from reception of over the air signals. This will be further considered hereinafter.

Various of the elements thus far described are also shown and described in my co-pending application for patent on Improvements in Subscription or Pay Television, and The Like, Ser. No. 459,399, filed May 27, 1965 issued Jan. 23, 1968 as Patent No. 3,365,542. The present application includes additional features and is capable of further operations, not disclosed in such earlier application. These will next be referred to briefly in order that various of the purposes and function disclosed herein may be better understood.

The present disclosures also include means whereby color signals received by the "Pay" receivers when transmitted over the transmitting path which is non-accessible to conventional receivers (being herein shown as a co-axial cable path), may be translated either as a color translation, or as a monochrome translation. Such means is normally in condition such that the so-received color signals (co-axial path) will normally be translated as a monochrome translation, no pre-pay or subscription operation having been made. Provision is also made such that the reception of program renditions arriving over the co-axial line cannot be received by the "Pay" receiver until the attendant effects a proper switching operation. When such attendant-produced switching operation is performed, a further operation is effected in the "Pay" receiver, such that the now received color signals arriving over the co-axial path are translated as a monochrome translation, no instruction having yet been given to the attendant that the rendition is desired to be made in full color. When a proper signal is produced by the user of the receiver in question, such signal informs the attendant that such user desires to receive such rendition in color. Thereupon the attendant performs a further simple switching operation which causes such rendition to be translated to such receiver in color, for which a subscription charge may be made.

In connection with the foregoing operations provision is also made such that the user of the receiver in question may cause his receiver to produce the rendition in color by insertion of a coin or token into a conventional coin or token box located conveniently to his receiver. This further provision for enabling the user to effect translation in color instead of in monochrome may, however, be disregarded and not included in the equipment, thus making it necessary for the user to purposely request the attendant to effect the color translation operation. Such an operation may be desirable, in order to enable production of desired records of uses of the receiver in question, as for example, in connection with accountancy operations, or analysis of the uses of the receiver in question.

Provisions are also included in the equipment hereinafter disclosed, for effecting various other operations. Accordingly, the following further statement of objects and operations is proper at this point:

The presently disclosed equipment includes a receiver (preferably compatible) capable of receiving and translating either monochrome or color signals, in the case of reception of monochrome signals, producing a monochrome reception; and in the case of reception of color signals, producing either a color translation or a monochrome translation, selectively. I have previously explained that I have provided a switching element in connection with the radio frequency input connection to the receiver. The selection of operation in the color translation is made by operation of switching elements presently to be disclosed. Additionally, I have made provision for normally retaining such switching elements in position for broadcast over-the-air reception, but for shifting to the position for reception from the alternate transmission path under certain controlled operations.

In addition to the foregoing, I have made provision such that even when the switching element is in its position for reception of broadcast signals, such signals will not reach the receiver's input connection until the attendant at the control station has purposely produced a further switching operation under his control. By this means, no reception either broadcast or from the alternate transmission path, can be produced by the receiver until permitted by the attendant. By this means the following benefit is produced for such installations as hotels, motels, and other similar installations: normally the receiver switching control by attendant is set to the position for non-reception of any form of program. This will ensure against improper use of the receiver, when the room or the apartment is vacant. When, however, an occupant is assigned to the premises in question, the attendant will be notified of such occupancy, and will thereupon make the receiver operable by performance of the proper switching operation. Thereafter the occupant of the premises may operate the receiver for reception of conventional broadcast programs, or pay or subscription programs, according to the disclosures hereinafter to be made.

Provision is made for producing a signal to the occupant of the premises when a special or pay or subscription program is available from any sending station to which the receiver may now be tuned. This provision includes a signal lamp in or in connection with the receiver in question. Such lamp will become illuminated whenever, during the operation of the station selecting button or knob, a station is tuned, from which such a special or pre-pay or subscriber program is, at the time, being emitted. Thus, as the occupant tunes the tuning button he will be informed of the availability of a special or pay program on each of the various tuned positions, from which such special programs are at the time available. The occupant may then determine which of two or more special programs (emitted by different sending stations) he may decide to receive, and he may leave his tuner at the presently tuned position, or may shift to the tuning position of another available special, pay program, for his entertainment.

During the foregoing tuning operation there may also be delivered to the attendant a lamp signal corresponding to each station as tuned, provided that such station is at the time in question, delivering a special program for pay or subscriber reception. For example, if during a tuning movement two or more stations are passed over, each of which is at the time emitting its special program, the attendant will be informed as to which of such programs is selected for reception, since the lamp corresponding thereto, will remain illuminated. This operation will be fully explained hereinafter.

During the foregoing operations, the signal lamp at the control station will be illuminated rather dimly, but sufficiently to draw the attention of the attendant. If, finally the user decides to receive a selected program, he will leave his tuning element at the selected station position, thus causing the control station signal lamp to continue to glow dimly. The attendant will be thus informed that reception of the indicated station is desired. Up to this stage of proceedings reception of the special program, by such receiver, has not been available, although signalled to the user of the receiver in question. The attendants may now produce a simple switching operation to make such special program available. This switching operation may comprise a simple insertion of a plug into a socket corresponding to the sending station in question, such insertion being only part-way, to a first defined insertion position. When the plug is thus only partially inserted, connections will be established in the occupant's receiver, such that the special program will be received and translated in monochrome instead of color, assuming that the signals being emitted from the sending station are for color translation. This may be a non-pay or non-subscription reception of the program in question.

If the occupant desires reception of the program in its superior aesthetic quality (color translation), the occupant may signal to the attendant, the occupant's desire for such special, pre-pay or subscription rendition of the program. The means to produce such signal to the attendant may comprise a simple button on or in connection with the tuning element, which simple button, when depressed by the occupant, will cause the signal lamp at the location of the attendant, to glow brightly. This will inform the attendant that reception of such special program in full color, is desired. Such full color, superior aesthetic quality reception will then be produced by the attendant by producing full insertion of the plug into its socket, being a second defined position of such plug, and being a pre-pay or subscription reception.

It is noted in connection with the foregoing explained operations, that there may be times when the occupant does not desired to use the pre-pay or subscription features thus provided for his entertainment, but will be satisfied with reception of the conventional programs being emitted by broadcasting over the air. Under such conditions the need for making provision to signal the attendant as explained previously will not exist, and in fact it will, under such conditions be disadvantageous to produce any signal to the attendant. Accordingly, I have made the following provision, additional to those already explained:

I have provided a token operated unit in the lines between the tuning contact elements already described, which token unit is normally open, so that until a token is inserted therein, the signals to the attendant will not be produced. Therefore, with this supplemetal unit any tuning operations produced by the occupant without insertion of the token, will fail to produce signals to the attendant, even when tuning or passing over tuning positions corresponding to stations emitting special programs at the time of such tuning operations. Then, when it is desired to test for and possibly tune to a station or stations from which special pay or subscription programs are, at the time being emitted, such token may be inserted prior to such tuning operations for determination of the special program to be received; and the proper signals will be transmitted to the attendant, as already explained herein.

A further alternative operation may be produced by the presently to be described equipment, as follows:

It has been explained, that when the attendant has inserted the proper plug into its socket to the first defined position, connections are established whereby the special program may be received in monochrome, without pre-pay or subscription operation, and that by further insertion of such plug to its second defined position, the program will be received in its superior aesthetic quality (e.g., in color). Alternatively, I have provided a coin or token operated unit corresponding to each receiver, and so interconnected into the circuitry, that by insertion of a token or coin therein, the reception of the program will be produced in color, instead of monochrome, without need of the further services of the operator to complete the insertion of the plug into the socket to its second defined or final position. Such token or coin operated unit should, in such case, be a time control unit, constituted to terminate the intended operation at the end of the time interval for which it has received prepayment.

As already referred to and disclosed in my said co-pending application, Ser. No. 459,399, Patent No. 3,365,-542 the special or pre-pay or subscription rendition of the program, when translated for the pay or subscription operation, may be one in which the conventional "commercials" may be eliminated, so that the entertainment afforded to the user of the present equipment will then be continuous and uninterrupted for the duration of the program itself, but including of course such necessary announcements as may be properly a portion of such program. The audio translation of such special program, by the non-subscribers' receivers may, however, include the commercials. In this connection it is also noted that such elimination of such commercials on the pay or subscription translation should be provided whenever the special program is being received and translated, whether the translation by the subscriber be in monochrome, without pre-pay or subscription operation, or in color, requiring such pre-pay or subscription operations. When the equipment needed for production of the presently disclosed operations is supplied on a basic rental or like consideration, the hotel or other proprietor of the premises in which the equipment is installed, will thus be enabled to recoup such rental charges from the occupant of the room or apartment wherein the receiver is installed, by proper adjustment of such rental or similar charge, justified by the superior quality of the service made possible by the use of the improvements herein disclosed.

It is to be noted also, that I have herein made provision for selective tuning of more than a single station sending out its signals according to both of two renditions of a program at the same time. Thus, in the showing hereinafter referred to I have shown schematically, provision for reception of any one of three programs emitted by three sending stations, with provisions for selecting, by use of each receiver, that program which may be selected by the user, assuming that all three of these sending stations are emitting special or pre-pay or subscription programs, at the time in question.

Although I have in the foregoing statements made reference to installations in hotels, motels, and large accommodation installations, it will be understood that reference to such particular kinds of installations is made by way of illustration only, and not by way of limitation.

It will be evident that the structures and operations herein disclosed are constituted for reception of the program emitted from such a sending station as a CATV station, when such station is provided with a broadcasting antenna, as well as non-accessible transmission (e.g., coaxial) lines, to its subscribers. This is true since the switch 35 (hereinafter to be described and which is also shown in my earlier application, S.N. 459,399, Patent No. 3,365,542), makes provision for selective program input to the receiver—either from the broadcast rendition, or from the transmission means which is non-accessible to non-pay or non-subscriber receivers. Such program may be a program which is received and rebroadcast, when provision is made for a non-accessible rendition of the program, except by pre-pay or subscriber operation. Thus, when the features of my present invention are included in or with a CATV installation, such CATV station may send its program without commercials to its pay or subscriber clients, and such CATV station or some other sending station, provided with an antenna, may send out that program by a rendition which includes the commercials, with selection possible at the desire of the user of the pay or subscriber receiver, and with requirement for pay or subscription operation when receiving the coaxial or other non-accessible rendition, from the CATV station.

Other objects and uses of the invention will appear from a detailed description of the same, which consists in the features of construction and combinations of parts, hereinafter described and claimed.

In the drawing:

FIGURE 1 shows, schematically, an installation consisting of a sending station equipped to emit a program through two paths or channels of transmission, one of which is non-accessible to conventional receivers; together with a showing of a conventional receiver capable of receiving and translating a color signal emitted program, in color (or in monochrome, if such receiver is a monochrome receiver), and a showing of a pay or subscription receiver, equipped to receive and translate the emitted signals from either of such paths of transmission, selectively; such receiver being equipped to translate color signals received from one such transmission path, either as a monochrome or as a color raster translation, selectively; and including means which includes a control station constituted to control the reception and translation of the program by such pay or subscription receiver according to various conditions of such controls, including operative features controlled by the attendant of such control station, and according to received signals;

FIGURE 2 shows a pay or subscription receiver, schematically, or system of receivers, each of which is constituted to effect reception of the signals from a plurality of sending stations, each of which may emit special or pay programs; with provision in each receiver for selection of reception from any one of such sending stations, and controls for each such receiver to enable reception by such receiver, such selected program in either of two aesthetic qualities (monochrome or color when the received signals are constituted for production of such receptions; and this figure also shows various signalling elements and provisions for advising the attendant of a control station which serves all such receivers, concerning the desired reception by each such receiver;

FIGURE 3 shows a modified form of attendant-operated plug-in unit and connections thereto, for control of the input to the pay-receiver, which may be used in substitution for the attendant-operated plug-in unit shown in FIGURE 1; such unit of FIGURE 3 making it impossible for the occupant-user of the pay-receiver to produce signalling to the attendant prior to purposeful insertion of the plug into its socket plate element by the attendant;

FIGURE 4 shows, on enlarged scale as compared to FIGURE 2, one of the tuning rotary contacts of a tuning element, with provision to enable the user of the receiver to cause the signal lamp at the control station, to glow brightly when it is desired to produce a corresponding signal to the control station attendant;

FIGURES 5, 6, 7 and 8, show, respectively, a plug of the form shown in FIGURE 3, in several successive operative positions, as follows: FIGURE 5 shows the plug in elevation completely removed from the socket plates, but in position for insertion thereinto; FIGURE 6 shows such plug inserted into one of the corresponding sockets to the first defined position, whereby monochrome reception may be produced from a color signalled program, received by the pay-receiver over the path which is non-accessible to conventional receivers; FIGURE 7 shows a view similar to that of FIGURE 6, but with the plug inserted fully to its second defined position, in which the color signalled program, received over such path which is non-accessible to the conventional receivers, may be translated in full color; FIGURE 8 shows a longitudinal section through such plug element on enlarged scale;

Figure 12:
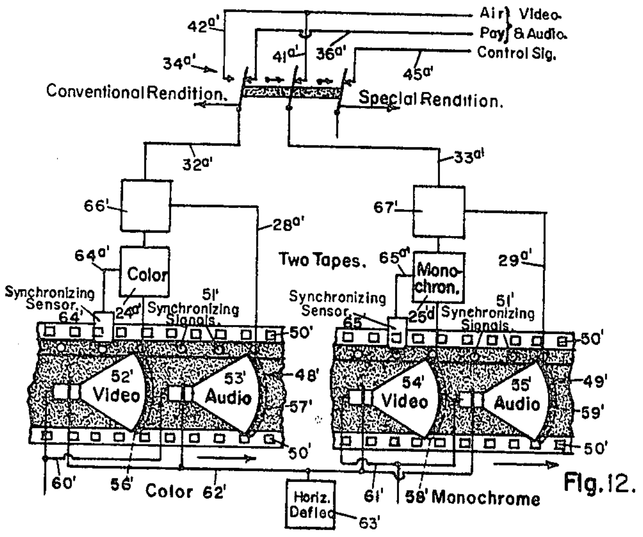
Figure 13:
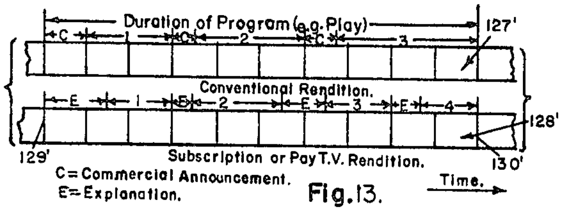
Figure 11:
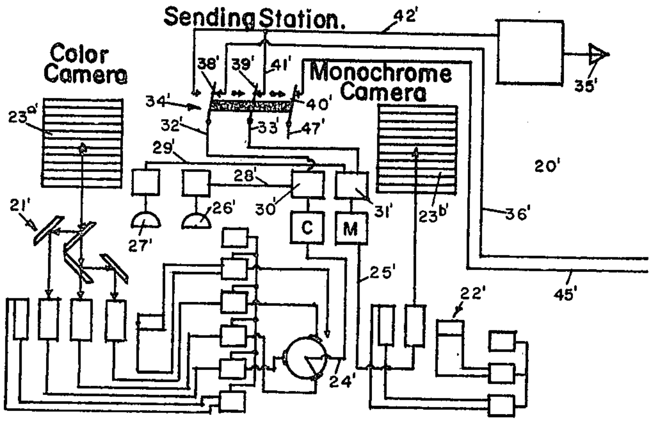
FIGURE 11 shows, schematically, a sending station similar to that shown in FIGURE 1.

FIGURE 12 shows, schematically two tape recorder units upon which the inferior and the superior quality renditions of a program may be recorded, and from which tapes such programs may be translated for producing the signals, both video and audio, for such two renditions; with switching provision for emitting either conventional (non-pay) programs, or special (pay or subscription) programs; and such showing of FIGURE 12 may be used in connection with the disclosures shown in FIGURES 2 to 10, inclusive, and for making provision for emitting the one rendition with commercials instead of the announcements referring only to the subject-matter of the program, and for emitting the other rendition without commercials, and with inclusion only of audio elements referring to the subject-matter of the program; and FIGURE 13 shows, schematically, a time relation between the elements of the "Conventional" rendition, and the elements of the "Subscription or Pay T.V. rendition" of a selected program, wherein the "Conventional" rendition includes commercial announcements, and the "Subscription or Pay rendition" includes only announcements comprising a portion of the subject-matter of such program.

Figures 1, 2, 3, 4, 5, 6, 7, 8, 9:
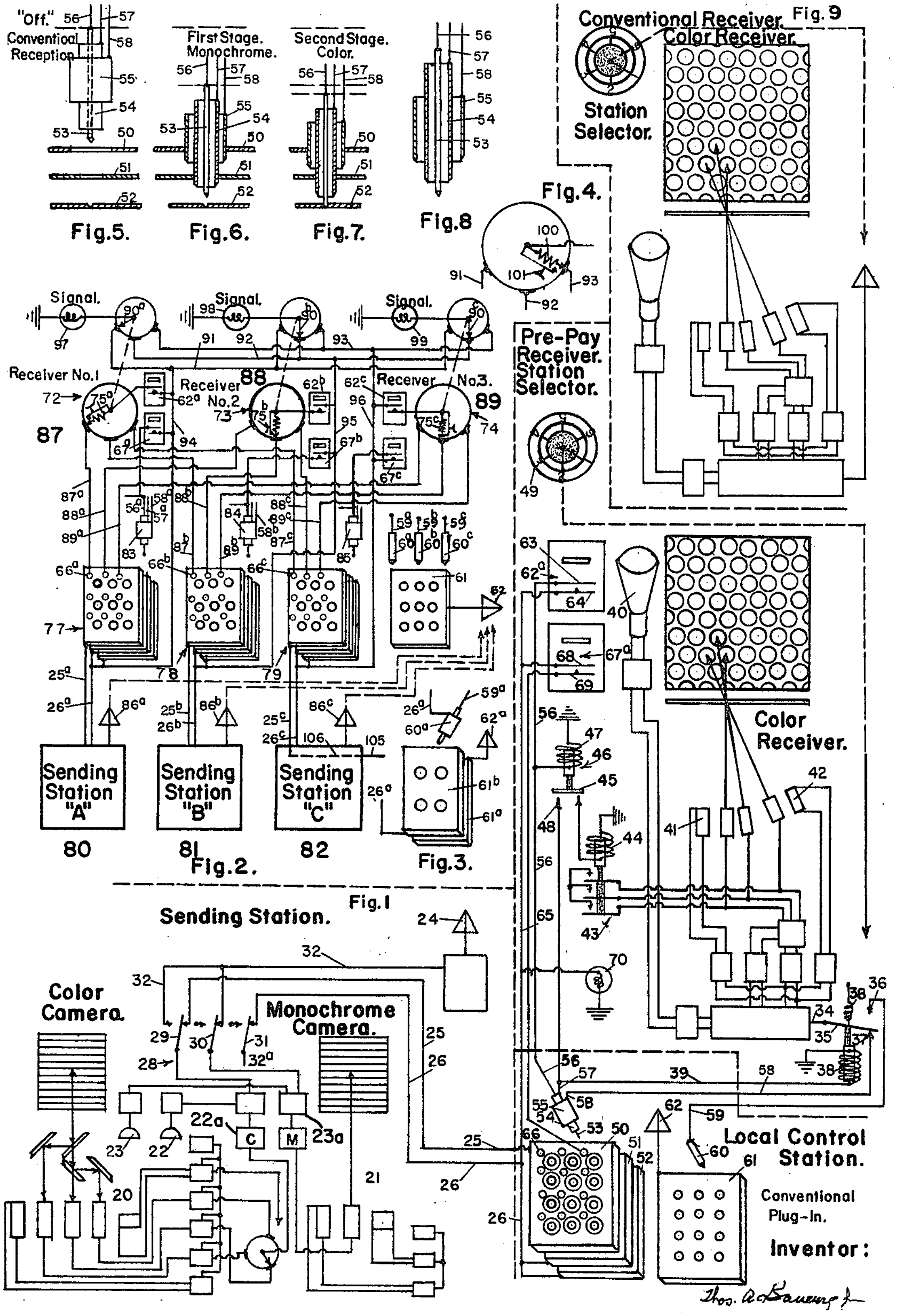
FIGURE 9 shows, schematically, a conventional color receiver which may receive the non-pay or non-subscription programs according to conventional reception operation.

Refering first to FIGURE 1 (which includes the leftwardly extending portion illustrating the sending station), the same includes the color signals emitting camera elements, schematically shown at 20, the monochrome signals emitting camera elements, schematically shown at 21, the microphones 22 and 23, for audio input to the color signals stream, and for audio input to the monochrome signals stream, respectively, the antenna for emission of one rendition of the program to broadcast such rendition 24, the leads 25 and 26, extending from the sending station to a control station 27, the lead 25 carrying radio frequency signals of the program to such control station, and the lead 26 carrying "control" signals to such control station. Conveniently, such lead 25 should be of the nature or order of co-axial, as is well understood in the art. Switching gear 28 is shown whereby various signal emitting functions may be produced, as will be hereinafter explained. Preferably, but not necessarily, such switching gear includes the three tongues or movable contacts 29, 30 and 31, connected, respectively, to the color signals and color audio producing elements, to the monochrome signals and monochrome the audio producing elements, and to a source of control current 32. The switching structures are such that with the tongues in their right-hand shifted position, shown in FIGURE 1, the color signals and audio rendition is delivered to the lead 25, the monochrome signals and audio rendition is delivered to the lead 32 leading to the antenna and related structures, and control current is delivered from the input lead to the lead 26. Alternately, when the switch tongues are in their left-hand shifted position, the color signals and audio are delivered to the lead 32 leading to the antenna and related structures. It is noted that the two microphones 22 and 23 (FIGURE 1), deliver audio signals to the color signals unit 22ª and to the monochrome signals unit 23ª, separately. Thus non-commercial audio announcements may be included in the color video signals emission, and if desired commercial announcements may be included in the monochrome video signals emission.

FIGURE 1 also includes a schematic showing of a color signals receiver of the three-gun type, including the radio frequency input connection 34 controlled by the switch 35, having the stationary contacts 36 and 37, with the spring 38 normally retaining such switch in engagement with the contact 36, but movable to engagement with the contact 37 (as shown) by energization of the solenoid 38 by current supplied over the line 39. Such so-shown receiver also includes the conventional speaker unit 40, the conventional three-gun structure, and the conventional horizontal and vertical deflection producing units 41 and 42, respectively.

The showing of FIGURE 1 also includes means constituted to cause the three gun structure and related elements to produce the raster in monochrome when the arriving video signals are for color production. Such monochrome producing means is controlled and activated under control, as follows: Such controls include the switching unit 43 which is normally in its open position, as illustrated. Such switch when activated causes all three of the color guns to be subjected to the same illumination producing controls, to thus produce excitation of the three color areas of each color array to be commonly activated as a group for production of white illumination of varying degree of intensity. Such switch is moved to its activated position by energization of its solenoid 44. Such solenoid 44 is electrified when the movable contact 45 of the relay 46 is allowed to fall due to non-supply of current to the solenoid 47, and assuming that the stationary contact 48 is at the time electrified. Either the raising of such contact 45 by electrification of the solenoid 46, or the non-electrification of the contact 48, will allow the switch 43 to open, due to non-electrification of its solenoid 44, thereby allowing the received color signals coming to the input connection 34 to be translated in color. Such non-energization of the solenoid 44 or non-electrification of the contact 48, will be discussed hereinafter.

Means to tune the receiver thus schematically shown and briefly described, is shown by the tuning button actuating the conventional tuning capacitors or other elements in well understood manner. Six tuning positions are indicated for comparison with such unit, the button being numbered 49.

The installation shown in FIGURE 1 and other figures of this case, is one including a control station whereby each of a plurality of receiving units may be served for production of various operations, some of which have already been briefly explained. Such control station, 27, includes certain switching of like gear; and for purposes of convenience in illustration, as well as illustration of a convenient switching structure, well adapted to the present purposes, I have shown the socket and plug in arrangement including the socket plates 50, 51 and 52 in parallel arrangement, and with their several plug rfeceiving holes also in alignment, so that insertion of a plug at any selected location may cause production of a plurality of electrical connections, either simultaneously or in succession, as well understood in the electrical arts. The details of such plug and socket arrangement will be described presently.

Various elements other than so far described are provided in or in connection with the showing of such receiver of FIGURE 1, for production of further functions These too, will be described presently.

At this point, however, it is proper to describe briefly the structures of the local control station, as follows:

The socket element plate 50 is connected to the lead 25 which delivers radio frequency signals from the sending station when the switching facility 28 has its tongues in their righthand position, shown in FIGURE 1. Such signals are for the color picture reception and translation (except as determined by the monochrome position of the switching unit 43). The socket plates 51 and 52 are both connected to the line 26 by which the control signal is delivered to such socket plate unit. One of the plugs for insertion into a socket plate is shown in section in FIGURE 8 (and also in FIGURES 6 and 7). Such plug element includes the central tip conductor 53, the inner sleeve conductor 54, and the outer sleeve conductor 55, such several elements being insulated from each other. Such three elements are of lengths such that their lower ends are progressively higher (measured from the lower end of the tip); and the conductors 56, 57 and 58 are connected to the three conductors as shown in various figures. The three socket plates are shown in fragmentary form in FIGURES 5, 6 and 7, in which figures one of the plug elements is also shown in its three significant positions. Thus, in FIGURE 5 such plug is fully removed from the socket plate structure. In FIGURE 6 the plug unit has been inserted to its first defined position, wherein its inner sleeve 54 has engaged the socket plate 51, and its outer sleeve has engaged the socket plate 50, but the tip element has not yet engaged the socket plate 52. Accordingly, in such first defined plug position conductor 57 is connected to the control line 26 (see FIGURE 1), and conductor 58 is connected to line 25, being the radio frequency line which is non-accessible to a conventional receiver. Next, by fully inserting the plug to its second defined position, the line 56 is also connected to the socket plate 52, which is also connected to the control line 26. Following this explanation it will now be seen that the following operational conditions are produced for the three plug conditions above described:

First: Plug out, none of the plug elements functions. Accordingly, although switch contact 45 is down against contact 48 (and complementary contact), no current is delivered to solenoid 44 of relay 43, so that receiver may translate color signals for production of a color translation and raster, if such color signals be received at the input connection 34. It is now noted that until the plug is inserted to its first defined position, the solenoid 38 of the switch unit 35 remains in its raised or spring held position, against the upper stationary contact 36. This is the normal antenna contact for input of the radio frequency to such receiver; but examination of FIGURE 1 shows that such contact 36 connects over the line 59 to a simple plug 60 which may be inserted into a corresponding opening of the socket plate 61. Such socket plate 61 is connected to the antenna 62 which may constitute a "Master Antenna" for a group of the pay-receivers, one of which is herein being described. Accordingly, until the attendant inserts the plug 60 into one of the sockets of the plate 61 no functioning of the receiver will occur, whether the receiver be tuned to the station then emitting a program over the air, or not. Furthermore, this condition exists whether a program is being broadcast from the station shown in FIGURE 1 or any other broadcasting station whose signals are receivable at the location of the receiver shown in FIGURE 1; and this condition also exists whether the sending station shown in FIGURE 1 be broadcasting a color program or a monochrome program. When the presently disclosed improvements are installed in such a location as a large hotel or motel, this provision will make it possible to forbid use and reception of the receiver located in an unoccupied room or apartment; but when such room or apartment becomes occupied its receiver may be made usable by merely inserting the corresponding plug 60 into one of the sockets of the plate 61. This is done by the attendant at the control station.

It is now noted that when such plug 60 has been inserted into a socket of the plate 61, the receiver in question may receive, without pre-pay or subscription operation, programs emitted from the sending station illustrated in FIGURE 1, over the air, in either monochrome (the switch 28 being in its right-hand position shown in FIGURE 1), or color (such switch 28 being then in its left-hand position), it being noted that for such operations the plug for the pay or subscription operations has not been inserted into its socket plate, the emitted program being, at such time, a non-pay or non-subscriber program.

Referring now to the switching operations which may be produced by use of the plug and socket plate arrangement shown in FIGURE 1 and in detail in FIGURES 5, 6, 7 and 8, the following operations are noted:

When the plug for a specified receiver is inserted into the three plate unit to its first defined position, the outer sleeve 55 engages the upper plate 50, to which the radio frequency line 25 from the sending station switching facility 28, is connected, and since the connection 58 from such outer sleeve is connected to the lower contact 37 of the switch element 35, the input to the reeciver is now served with such radio frequency signals, from the color camera of the sending station, the switch tongue 35 being now down against the force of the spring. At the same time that such operation occurs, or slightly prior thereto, the inner sleeve of the plug engages the socket plate 51, thus delivering control current to the solenoid 38 of the switch 35, and bringing the tongue of that switch down into engagement with the contact 37 above referred to. Thus, such first defined plug position serves to provide radio frequency signals to the contact 37, from the sending station, and over the transmission line which is non-accessible to conventional receivers, and at the same time, places such signals into operational connection with the pay-or-subscriber receiver.

It was previously pointed out that although the down position of the contact 45 of the relay 46 produces engagement of such contact 45 with the stationary contact 48, the switch unit 43 is not activated until current may be supplied to such contact 48. Insertion of the plug to its first defined position with consequent engagement of the inner sleeve 54 with the socket plate 51, delivers control current to such stationary contact 48 thus activating the switch unit 43, with consequent modification of the circuitry of the guns, to produce a monochrome translation of the received signals, although such signals were sent out from the sending station as color signals. Thus, insertion of the plug causes the pay receiver to produce a monochrome translation of the picture which, as we have explained, should be a free translation of the special program.

Next: By fully inserting the plug into the socket plate the tip contact 53 will be brought into engagement with the socket plate 52, which is a plate connected to the control line from the sending station, when the switching facility 28 is in its right-hand position shown in FIGURE 1. Such tip contact is connected to the solenoid 47 of the relay 46. Therefore such relay is now activated, raising its contact 45 from the contact 48 (and from the companion stationary contact), thus discontinuing supply of current to the relay 43, allowing such relay to fall, and thus restoring the circuitry of the receiver to its condition for translation of the received color signals, as a color raster translation.

I have also shown in FIGURE 1 the coin box or token unit 62, having its contacts 63 and 64 normally open, and connected respectively to the lines 56 and 65 which when bridged by the closing of the contacts 63 and 64 together, will serve to activate such relay 46 without need of producing such activation by the attendant at the control station.

I have also shown, corresponding to each of the sockets of the three plate socket unit, a small lamp 66 which when illuminated will serve to call the attendant's attention to the corresponding receiver (in the illustrated case, the receiver shown in FIGURE 1). Such receiver is also provided with a second token box 67 having the contacts 68 and 69 which are normally open but are closed by insertion of a token. When it is desired to have the attendant produce the pay-or-subscription operation for production of the program in its superior aesthetic quality, the occupant of the premises may signal the attendant by such insertion of the token, with corresponding illumination of the signal lamp.

I have also, in FIGURE 1, shown a signal lamp 70 at the location of the receiver. This lamp serves by its illumination to inform, that a special or pay program is available from the sending station in question. For this purpose such lamp is connected to the control line 26 by the line 71, so that when the switching facility at the sending station is shifted to its right-hand or special program position, such lamp, in each pay receiver the tuned to the sending station in question, will serve notice of the availability of the special program if translation of such special program is desired.

I next refer to FIGURE 2. Therein I have shown, schematically, three pay receivers; plug-in equipment contained in a single control station controlling such receivers; and by simple block diagram, three sending stations, each equipped to emit its signals and program, both for conventional program rendition, and for pay program rendition, according to the features of my present invention, and including features of my said application, Ser. No. 459,399; together with various interconnections between such schematically shown elements, whereby any one of the receivers may receive any tuned conventional program, or any selected pay-program from any selected sending station. This equipment includes the following:

The tuners for the three receivers are shown at 72, 73 and 74, each one carrying a rotatable contact 75$^a$, 75$^b$ or 75$^c$, as the case may be, adapted for engagement with either of three stationary contacts as selected. Another rotatable contact, 90$^a$, 90$^b$ or 90$^c$ is also provided for each corresponding tuning element, being shown drivingly connected to the first mentioned rotatable contact of its receiver, by the broken line as shown. These rotatable contacts 90$^a$, 90$^b$ and 90$^c$ are also each engageable with either of three stationary contacts as selected. There are provided in the single control station shown, three sets of contact plates 77, 78 and 79, corresponding to the three sending stations 80, 81 and 82, each of such sets of socket contact plates including three such plates, corresponding to the plates 50, 51 and 52 shown in the control station of FIGURE 1. For purposes of illustration, only, I have shown each of such contact plates as being provided with nine socket openings in its top plate. These would of course serve nine receivers; but in the present case only the top three such openings of each set of contact plates are used. Corresponding to each such opening there is also shown a small circle a signal lamp 66$^a$, 66$^b$ or 66$^c$ corresponding to the signal lamp numbered 66 in FIGURE 1. The two-sleeve, single-tip plugs 83, 84 and 85 are also shown, corresponding to the three receivers, each such plug being of the type detailed in FIGURES 5, 6, 7 and 8, and one of which is shown in FIGURE 1. Each of these plugs may be inserted into that socket of any selected plate unit, which socket corresponds to the receiver which is served by such plug. For example, the plug 83 may be inserted into the upper left-hand socket opening of either of the units 77, 78 or 79, as selected, and corresponding to that sending station of which the program is desired.

The following interconnections are shown in FIGURE 2;

The radio frequency lines $25^a$, $25^b$ and $25^c$ extend from the sending stations 80, 81 and 82, respectively, to the top plates of the corresponding units 77, 78 and 79, to supply radio frequency signals to such top plates; and the control lines $26^a$, $26^b$ and $26^c$ extend from the sending stations 80, 81 and 82, each to the two lower plates of such corresponding units 77, 78 and 79. Each of such sending stations is provided with its antenna $86^a$, $86^b$ or $86^c$, as the case may be, for broadcasting over-the-air programs according to the uses of the antenna 24 shown in FIGURE 1. The signal lamp lines $87^a$, $87^b$ and $87^c$ extend from the successive stationary contacts of the tuner element 72, to corresponding signal lamps of the units 77, 78 and 79; the signal lamp lines $88^a$, $88^b$ and $88^c$ extend from the successive stationary contacts of the tuner element 73, to corresponding signal lamps of the units 77, 78 and 79; and the signal lamp lines $89^a$, $89^b$ and $89^c$ extend from the successive stationary contacts of the tuner element 74, to corresponding signal lamps of the units 77, 78 and 79, respectively. Since such units 77, 78 and 79, all located in the control station in question, correspond to the sending stations 80, 81 and 82, respectively, the attendant can readily determine which station pre-pay program is desired by the user of each of the receivers so signalling.

Each of the rotary contacts $90^a$, $90^b$ and $90^c$ is connected to the tuning element of the corresponding receiver, so that such rotary contact comes in succession to corresponding stationary contacts which correspond to the stations tuned. The three bus bars 91, 92 and 93 are provided in connection with such elements just referred to. Each of these bus bars connects to a corresponding stationary contact of each of the elements so connected to the tuning elements. The bus bars are connected to the control lines from the sending stations, by the lines 94, 95 and 96, respectively. Accordingly, as the tuning element of each receiver is shifted, its rotary contact $90^a$, $90^b$ or $90^c$, as the case may be, comes into circuit with each of the control lines of the several sending stations, and becomes momentarily electrified thereby, until a tuning position is reached at which the tuning operation is stopped. Under this arrangement the following operations are produced:

Whenever the rotary contact $90^a$, $90^b$ or $90^c$, as the case may comes into engagement with a stationary contact corresponding to a sending station which is, at the time, emitting a pay program, such rotary contact is electrified; but such electrification does not occur when stationary contacts are engaged, as to which the sending stations are not, at the time, emitting pay programs. Thus the occupant is advised as to which sending stations are presently emitting pay programs, and he may make decision accordingly, as to whether he desires to receive a given station's program. The fact of such electrification is evidenced as follows:

A signal lamp, 97, 98 or 99, as the case may be, is connected to each of the rotary contacts $90^a$, $90^b$ or $90^c$. Thus, whenever a lamp becomes illuminated the user of the receiver is immediately informed that the corresponding sending station is at the time emitting a pay program.

I have previously referred to the illumination of each of the signal lamps 66 corresponding to the tuning of the identified sending station during the rotary movement of the contacts $75^a$, $75^b$ and $75^c$. I have also referred to the provision of means to advise the attendant when a station is tuned as to which station the user desires to receive the pay program. Such advice is provided as follows:

Each of the rotary contacts $75^a$, $75^b$ or $75^c$ includes a resistance element 100 by which the current flow through such contact is limited to a value which will cause the lamp 66 to glow dimly, but sufficiently to attract the attention of the attendant. Each of such rotary contacts also includes a button 101, which is readily depressed by the user, and which, when thus depressed serves to bridge the resistance element of such rotary contact, thus subjecting the corresponding signal lamp 66 to the full potential (and current flow), with corresponding substantial increase in the brightness of the signal lamp's illumination of the signal lamp. The attendant is thus advised that the user of the receiver desires to receive the corresponding pre-pay program; and the attendant may produce the plugging operation needed to meet the signalled desires of the user.

It is noted that in FIGURE 2 I have shown the token boxes $62^a$, $62^b$ and $62^c$ for the several receivers, included in the connections between the several rotary contacts $75^a$, $75^b$ and $75^c$, respectively, and the control line extensions 94, 95 and 96, respectively. These boxes correspond to the element $67^a$ shown in FIGURE 1. Since these token boxes are normally open-circuited, it is evident that, the signals to the attendant (by illuminations of the signal lamps 66) will not be produced during the rotary movements during the tuning operations. However, by inserting a token into the box, the circuit will be conditioned for signalling the operator, each time a stationary contact is engaged by such rotary contact, provided that the corresponding sending station is emitting a pay or subscription program. It is thus possible for the user to seek a selected pay or subscription program which is at the time being, emitted without improperly signalling the attendant at the control station. When a desired station has been selected the attendant will be promptly informed of such fact.

I have also in FIGURE 2 shown the coin or token boxes $67^a$, $67^b$ and $67^c$. These correspond to the box $62^a$ in FIGURE 1, and when used serve to avoid need for the attendant to shift the corresponding plug to its second defined position, in order to complete the operations necessary for delivery of the selected program in color; and at the same time pre-pay has been made, avoiding need to charge the user of the receiver by an operation of the attendant.

In FIGURE 9 I have shown schematically, a conventional color receiver, receptive to signals on the air, to illustrate a receiver capable of receiving the conventional non-pay rendition of a program which may, at the time, be sent out by the sending station in question. It is unnecessary to describe such conventional receiver in detail, since its structure as shown is the same as that of the pay-receiver, with the exception of non-inclusion of elements specially provided for the pay and related operations.

It is noted that, once the user of a pay-receiver has tuned to a station from which a special program is now being emitted, the user may observe that program thus available for a short interval under the inferior rendition without pay or charge to decide whether he shall request production of the superior quality translation of such program, or shall tune to some other station position at which another pay or subscription program is being emitted, and test the reception of such other program, to determine which of such two programs he desires to receive in its superior quality. Having made such comparison and decision, he may then request the superior quality translation of that program which has now become his free choice, and thereafter receive such program in its superior quality, under the condition that pre-pay or subscription operation shall be made.

Referring again to the embodiment of circuitry and equipment shown in FIGURE 1, it appears that as soon as the switching facility 28 at the sending station is shifted to its right-hand position (shown in FIGURE 1) the line 65 is electrified by control potential. Thus any person present in a room or premises wherein one of the subscription or pay receivers is installed, may now signal the attendant at the control station for a plug-in operation by the corresponding plug 55 (83, 84 or 85 in FIGURE 2), whether such signalling person be a registered occupant of the room or apartment, or not. This is true since, in that embodiment the control line 65 extends directly from the incoming line 26, from the sending station. Under these conditions it would be possible for such an intruder to receive the special program, either in its inferior aesthetic quality or its superior aesthetic quality, as signalled, it being noted that the insertion of the plug 60 into the socket plate 61 is not required to enable such intruder to effect such signalling to the attendant. To meet this condition I have, in FIGURE 3 shown a modified arrangement, as follows:

The two plate socket element 61$^a$–61$^b$ of FIGURE 3 is substituted for the single plate element 61 shown in FIGURE 1, and the sleeve and tip element (plug-in) shown in FIGURE 3 is substituted for the simple plug element 60 shown in FIGURE 1. Also, the incoming line 26 from the sending station (control line) is connected to the upper plate 61$^b$ as shown by the line 26$^a$ in FIGURE 3, and is not directly connected to the line 65. Instead, the line 65 which carries control current and potential to the several units of the special receiver (see FIGURE 2), there numbered 26$^a$ (or 26$^b$ or 26$^c$) is then connected to the sleeve of the plug (FIGURE 3), so that until such plug is inserted into its proper socket opening of the control plate structure, control current will not be delivered to the line 94 (or 95 or 96) (see FIGURE 2), leading to the corresponding receiver. Under these conditions, it is necessary for the attendant to insert such plug (of FIGURE 3) into its proper socket, before the occupant of the room or apartment, can send signals to the attendant. Since such sleeve of FIGURE 3 comprises a portion of the plug to be inserted into its socket plate unit when the attendant is advised that an occupant will occupy the room or apartment in question, it is evident that such modified plug insertion will not only enable the occupant to tune and receive any conventional program (without pay or subscription), but will also place the receiver and its connections into condition such that the user may now produce testing for special program receptions, and produce the various operations incident to signalling the attendant. In the modified arrangement the incoming control line 26 remains connected to the plates 51 and 52, so that the functions of such insertion of the plug 55–54–53 remain unchanged, as previously described.

Although I have frequently herein referred to a monochrome translation and a color translation of the video signals when describing various structures and operations, such translation being, respectively, definitions for an inferior and a superior aesthetic quality of translation, such two forms of translation of the video component are referred to by way of illustration only, except when the operations may be of a type which necessarily requires such two specific forms of translation. I have moreover, also referred to a number of other pairs of translations, both video and audio, one each of such pairs being the inferior aesthetic embodiment, and the other of each of such pairs being the superior aesthetic embodiment. Accordingly, I do not intend to limit the invention to any one of such pairs, or to other pairs of operations, the translation of one of which is of inferior aesthetic quality, and the translation of the other of which pairs is of superior aesthetic quality, nor to differences of aesthetic quality lying solely in the field of the video translations; but I contemplate structures and operations wherein provision is made for choice selection of either of at least two translations, one being of inferior aesthetic quality, and the other being of superior aesthetic quality, and both such translations being intelligible to the person sensing the translations; except as I may limit myself in the claims to follow.

A further capability of use of the inventive concepts herein disclosed relates to their use in connection with CATV installations (Community Antenna TV). To illustrate such a use reference is directed to the "Sending Station C" shown in FIGURE 2, wherein I have, for illustrative purposes included the following instrumentalities:

Assume that station C is a CATV station, and that the line 105 is a line non-accessible to non-subscribers or non-prepay receivers, corresponding in this respect to the line 25 of FIGURE 1, such line delivering program material to the CATV station (assumed to be station C). Assume that such line 105 is delivering a special program, without commercials. Assume, too, that such line 105 is connected in the CATV station to the line 25$^c$ by the line 106 probably also including a switch whereby such connection may be made or disconnected as needed. Then by generating control current supply in such CATV station and feeding the same to the line 26$^c$ (FIGURE 2), the pay receivers 87, 88 and 89 may be operated as explained in the specification of this application, including various signals between the CATV station and such receiver, 87, 88 or 89. If then, the antenna 62$^a$ is receiving the same program (including commercials), as is arriving over the non-accessible line 105, each of the receivers 87, 88 and 89 may receive such program, including the commercials, without pay or subscription operation, or may receive the superior aesthetic quality program, without commercials, and either in monochrome, without pre-pay or subscription operations, or in color, by making pre-pay or subscription operations.

In the arrangement shown in FIGURE 10 I have illustrated three sending stations, and three receivers constituted to enable the various operations already explained herein, as well as certain additional operations, as will be explained. There is also included in this showing a control station from which various of the pay-or-subscription receivers may be controlled. Evidently a greater number of sending stations might be included in the system now to be explained, or a greater number of the pay or subscription receivers might be served from such control station. For example, such control station might serve a selected area of a large city or metropolitan area, being provided with the equipment needed to receive special pay or subscription programs from each of a number of sending stations equipped to provide the renditions of programs for reception in either of two aesthetic qualities, such number of sending stations being unrestricted.

Figure 10:
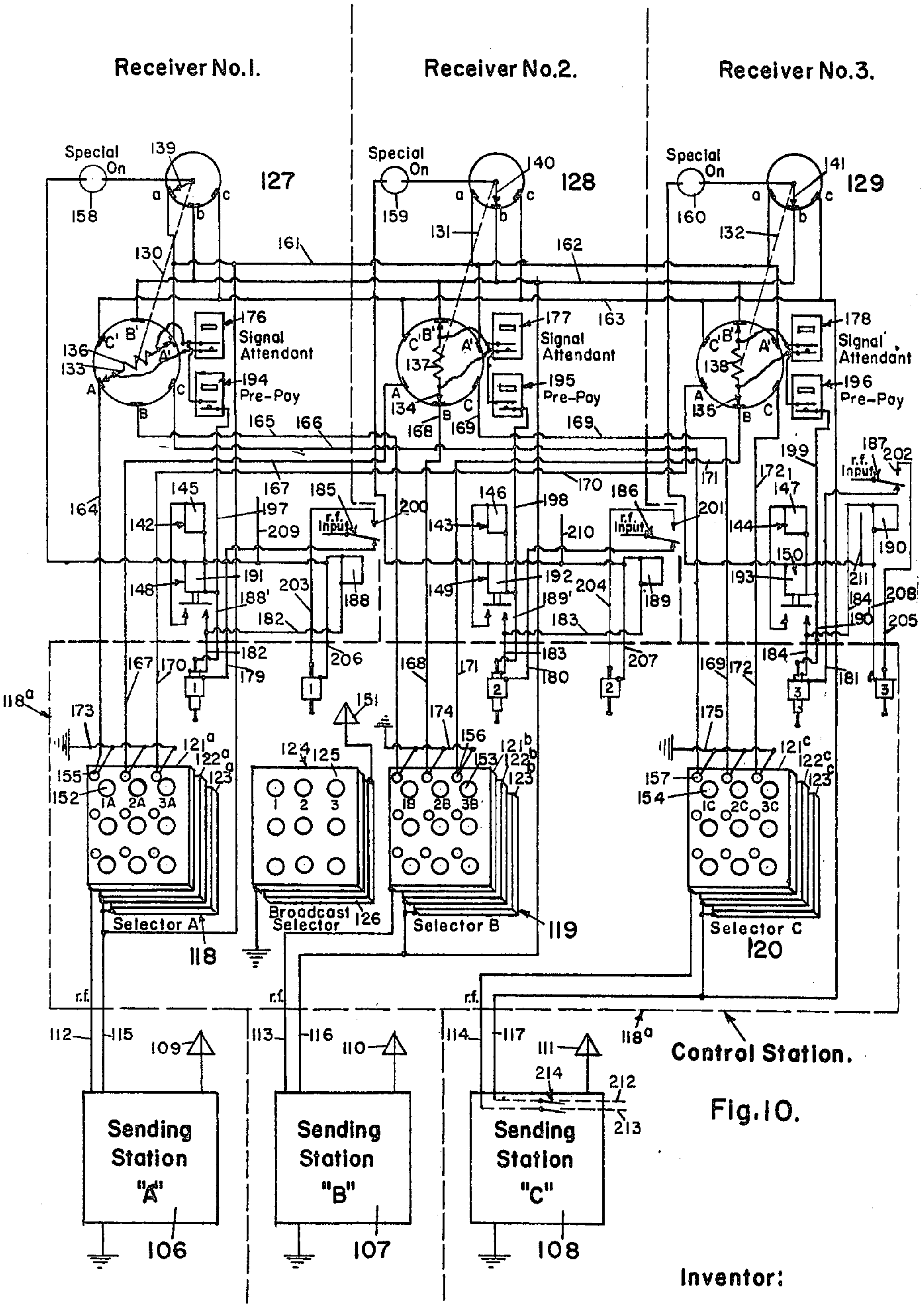
FIGURE 10 shows schematically, another pay or subscription television system, embodying modifications of the showings of FIGURE 2, which will appear in detail hereinafter.

In FIGURE 10 the three sending stations are shown at 106, 107 and 108, legended "A," "B" and "C," respectively for convenience of description hereinafter. Each of these sending stations is provided with camera and other equipment suitable to simultaneously emit video and audio signals corresponding to two renditions of the same program. In the illustrated embodiment such equipment is conveniently of the form shown in FIGURE 1 (Sending Station), constituted for emission of the video signals for monochrome translation or for color translation. The antennas 109, 110 and 111 are shown for the three sending stations, each corresponding to the antenna 24 shown in FIGURE 1. From each of the sending stations there are carried the wired lines for the R.F. signals, being the lines 112, 113 and 114, for the respective sending stations, and the control lines 115, 116 and 117, also for the respective sending stations. Such R.F. signal lines correspond to the line 25 of FIGURE 1; and the control lines correspond to the line 26 of FIGURE 1.

The control station is bracketed by the dashed line. This control station includes a "Selector" unit corresponding to each of the sending stations for which provision has been made, being the units 118, 119 and 120, respectively. Each of these selector units includes the three plates 121, 122 and 123 (provided with the suffixes *a*, *b* and *c*, respectively, for the three sending stations, "A," "B" and "C"). Such plates correspond to like plates 50, 51 and 52 of FIGURE 1, the units 118, 119 and 120 corresponding to the units 77, 78 and 79 of the showing in FIGURE 2. These selector units control the operations by which the several receivers connected to the control station, are caused to translate the special program in the superior aesthetic quality when desired by the users of such receivers.

The control station also includes a "Broadcast Selector," 124, having the two plates 125 and 126. This selector corresponds to the selector shown in FIGURE 3; and its plates 125 and 126 correspond to the plates $61^b$ and $61^a$ of FIGURE 3, respectively. This broadcast selector controls the input of broadcast R.F. video and other signals, to the receivers, when the reception of a receiver is being made from broadcast signals instead of from signals non-accessible to non-pay receivers.

Both the selectors "A," "B" and "C" and the Broadcast Selector 124, are included in circuitry which performs functions related to signalling operations.

The three receivers are identified as 127, 128 and 129, respectively. Each includes the tuning or channel selecting shaft 130, or 131 or 132, as the case may be, rotated in conventional manner; or movable or actuatable to select any one of the programs currently being received at the receiver in question. Each such shaft carries the movable contact element 133, 134 or 135, as the case may be; and each such contact element includes its oppositely disposed brushes or wipers, which engage with the pairs of oppositely disposed stationary contacts A, B and C, respectively. Accordingly, when such contact element is brought to any tuning position, its two end wipers engage the corresponding pair of stationary contacts (e.g., A–A′, or B–B′ or C–C′), thus establishing a circuit through such contact element, which may be identified as circuit A, or circuit B or circuit C. Each of the contact elements also includes a resistor, 136, 137 or 138, as the case may be, and the ends of each such resistor are connected by flexible leads to a bridging switch located at a convenient position for manipulation by the user of the receiver; and which bridging switch will be referred to hereinafter.

Each of the shafts 130, 131 and 132 also carries a movable contact element, 139, 140 or 141, as the case may be; and each such movable contact may engage with stationary contacts *a*, *b* or *c*, as the case may be, thus establishing signalling circuits, presently to be explained.

Each of the receivers includes a monochrome-or-color translation producing unit, 142, 143 or 144, as the case may be; each such unit including the solenoid-operated switching unit 145, 146 or 147, as the case may be, each such unit 142, 143 or 144 being constituted to cause translation either in monochrome or color, when the received video signals are color signals, as the case may be. In the illustrated embodiment, such selective translation is produced by units which, when the monochrome translation is to be produced, cause all of the three electron guns of a three gun receiver, to all produce substantially the same intensity of illumination as such intensity varies from elemental area of the raster to elemental area thereof. Specifically, the selective translating units illustrated in FIGURE 10 are of the same type as shown in FIGURES 1 and 2 of this case, and elsewhere also disclosed by me in patent applications either pending or issued. The functionings of the units 145, 146 and 147 are produced by the solenoids of such units, respectively. Accordingly, each of the units 142, 143 and 144 corresponds to the unit 43 of FIGURE 1, each of the units 145, 146 and 147 corresponds to the unit which includes the solenoid 44 of FIGURE 1, and each of the units 148, 149 and 150 corresponds to the switching relay 46 having the solenoid 47 of FIGURE 1. For purposes of simplicity in illustration, FIGURE 10 does not show the several guns and related elements of circuitry as shown in FIGURE 1, nor the details of operative elements of the units 145, 146 and 147, as the foregoing explanations are deemed sufficient for an understanding of the structures presently to be described.

The plates $121^a$, $121^b$ and $121^c$ of the selectors 118, 119 and 120 are served by the R.F. "non-accessible" transmission media (e.g., co-axial cables or lines) extending from the sending stations "A," "B" and "C," respectively, being the lines 112, 113 and 114. The two plates $122^a$ and $123^a$, $122^b$ and $123^b$, and $122^c$ and $123^c$, of the selectors 118, 119, and 120, respectively, are connected in the pairs shown, to the control lines 115, 116 and 117, from the sending stations "A," "B" and "C," respectively. Such arrangements are thus the same as correspondingly arranged elements of FIGURE 2.

The plates 125 and 126 of the broadcast selector 124, are connected to ground and to the master receiving antenna 151, respectively, thus distinguishing from the arrangement shown in FIGURE 3, when used in connection with other components shown in FIGURES 1 and 2. Certain benefits flow from this difference of connections; it being noted that although the master receiving antenna is connected to the lower plate in both FIGURES 10 and 3, in the arrangement of FIGURE 10 the upper plate is connected to ground, whereas in FIGURE 1 such upper plate is connected to the control line which extends to each receiver. This difference in structure enables reversal of various circuits, with the benefits just above referred to.

The left-hand and the right-hand plugs identified as 1 and 1, as 2 and 2, and as 3 and 3, are insertable into the corresponding socket units as follows:

Left-hand 1 into unit 118, right-hand 1 into unit 124; left-hand 2 into unit 119, right-hand 2 into unit 124; and left-hand 3 into unit 120, right-hand 3 into unit 124. Thus unit 124 serves all of the receivers, whereas the units 118, 119 and 120 are individual to the corresponding sending stations. It is noted that each of the sockets 152 of the unit 118 is identified by the numeral, 1, 2 or 3, corresponding to the receiver to be served by such socket, together with the letter "A" identifying the sending station whose program is to be received by the receiver in question; likewise that the sockets 153 of the unit 119 are identified by the numerals 1, 2 or 3, but with the letter "B" identifying the sending station whose program is now to be received; and likewise that the sockets 154 of the unit 120 are identified by the numerals 1, 2 and 3, but with the letter "C" identifying yet another sending station whose program is to be received. It is also noted that proximate to each of the sockets of unit 118 there is a small signal light 155, that proximate to each of the sockets of unit 119 there is a small signal light 156, and that proximate to each of the sockets of unit 120 there is a small signal light 157. Each of these signal lights will be illuminated rather dimly when the corresponding receiver is tuned to the sending station program "A," "B" or "C," when such sending station is at the time emitting a special program.

There is also provided proximate to each receiver a signal light 158, 159 or 160, as shown in FIGURE 10. These signal lights are connected to the rotatable brushes or wipers 139, 140 and 141 connected to the receiver tuning shafts 130, 131 and 132, so that each such light will be connected to the contact *a*, *b* or *c*, as the case may be, and if such contact be electrified at the time, the signal light will be illuminated, indicating that a sending station is now tuned, from which a special program is being emitted. Such indication will be afforded to the user of such receiver at the same time that the attendant at the control station is informed, by the signal light previously defined, that such receiver is presently tuned to the sending station to which such control station light corresponds. The successive illuminations of such receiver signal lights will enable the user to make selection, if available at the time, between the several special programs now available. The circuitry by which the above operations are made possible will be described presently.

When the user has made decision that he desires to receive a signalled program, he may signal the attendant accordingly. This is done by the following means:

The tuning of the receiver (No. 1, legended as 127, for example), to the position shown in FIGURE 10, brings the rotatable contact element 133 into engagement with a contact "A" which is connected to the attendant's signal light 155, illuminating the same dimly as already explained. Such dimming is produced by the inclusion of the resistor 136 in the rotatable contact. Flexible terminals from the ends of such resistor are brought out to a switching facility proximate to the receiver. By using such switch, the resistor is bridged, and the full available potential is applied to the signal light, brightening it substantially, enough to demand the attention of the attendant. Thereupon the further operations will be produced by such attendant needed to cause the translation of the program to be produced in its superior aesthetic quality. Such operations include the following:

As long as the plug right-hand 1, 2 or 3 remains unplugged there is no R.F. connection to the R.F. input element of a receiver, for reception of a broadcast program. Likewise, as long as the plug left-hand 1, 2 or 3 such plug remains unplugged there will be no R.F. connection to the R.F. input element of such receiver, for reception of a program directly from a sending station, over the non-accessible transmission medium (e.g., co-axial). Accordingly, the receiver is dead for any reception of video (or audio) signals. But the insertion of the plug right-hand 1 or 2 or 3, will activate the receiver into whose socket such plug is inserted, so that the user of such receiver may tune it from station to station, receiving, as he does so, the various broadcast programs then available. In the case of such an installation as a large hotel or motel, the attendant should be notified whenever a guest is to occupy an apartment, so that such attendant will then have plugged in the proper one of the right-hand plugs, into the proper socket of the broadcast selector 124, thus rendering the receiver in question operable for reception of any broadcast program.

The control lines from the several sending stations are identified as 115, 116 and 117, from the sending stations "A," "B" and "C," respectively. The control line 115 connects to the two lower plates 122[a] and 123[a] of the unit 118; the control line 116 connects to the two lower plates 122[b] and 123[b] of the unit 119, and the control line 117 connects to the lower plates 122[c] and 123[c] of the unit 120. Additionally, such control lines are carried to the locations of the receivers, and are there connected to the three bus lines 161, 162 and 163, respectively. Corresponding to the stationary contacts A, B, and C of the rotatable brushes 133, 134 and 135, which rotate according to the tuning operations, there are the companion stationary contacts A′, B′ and C′, respectively. Each of these is located opposite to its companion contact, so that for successive tuning positions the brushes engage A and A′, or B and B′, or C and C′, as the case may be, connecting such pairs together in the manner shown at A–A′, of receiver No. 1, or at B–B′, of receiver No. 2, of B–B′, of receiver No. 3. Bus line 161 connects to contacts A′ of the three receivers, bus line 162 connects to contacts B′ of the receivers, and the bus line 163 connects to contacts C′ of the receivers. Accordingly, those of the contacts "A′," "B′" and "C′" which contacts are connected to a bus line electrified by the control line from a sending station, will be electrified; and whenever one of the brush elements 133, 134 or 135 comes to such an electrified contact, the corresponding and opposite stationary contact will also be electrified, through the resistor 136 or 137 or 138, as the case may be, provided such resistor has not been bridged. This will be again referred to.

Each of the contacts A, B and C connects by a line to the corresponding signal light 155, 156 or 157 at the control station. These connections are such that each A contact is connected to a signal light A, that each B contact is connected to a signal light B, and that each C contact is connected to a signal light C. The indicia 1, 2 and 3 at such signal lights identify the receivers; and the indicia A, B and C identify the sending stations. The lines establishing such circuitry are designated as follows: from the receiver No. 1, lines 164, 165 and 166; from the receiver No. 2, lines 167, 168 and 169; and from the receiver No. 3, lines 170, 171 and 172. The signal lights of the several units 118, 119 and 120 are grounded by the lines 173, 174 and 175.

When it is desired to call the attendant to have the superior aesthetic quality reception produced, the resistor 136, or 137, or 138 may be bridged by the token box operation, shown at 176, or 177 or 178, for the several receivers. The contacts of each of these token boxes are normally open; thus they do not normally bridge the corresponding resistors, and the illuminations of the signal lamps are dimmed. Bridging any of such resistors causes full potential to be applied to the corresponding light, with increased current flow, and intensified brilliance. Preferably each of the token units 176, 177 and 178 is of the time control type, adjusted to a time interval sufficient to ensure that the attendant shall receive the desired signal. The number of tokens inserted into the unit will also serve as a check against the frequency of use of the receiver in question for reception of programs in their superior qualities. After termination of the time interval of closure of the contacts of the unit, the token will be deposited into a receiver of conventional structure.

Each of the left-hand plug elements 1, 2 and 3 is of the form shown in detail in FIGURES 5, 6, 7 and 8; and each of such plug elements is related to the corresponding plate unit 118, 119 or 120 in the manner already explained. Accordingly, partial insertion of such a plug element into its plate element serves to produce R.F. reception connection to the line 179, 180 or 181 leading from the outer sleeve of such plug element; and such partial insertion of such a plug element also serves to place control line potential on the line 182, 183 or 184, as the case may be, connected to the intermediate sleeve of such plug element. The lines 179, 180 and 181 lead to the lower stationary contacts of the R.F. input elements 185, 186 and 187 of the respective receivers, and the lines 182, 183, and 184, now electrified, lead to the solenoids 188, 189 and 190 which shift the R.F. input connection from its normally raised position, into engagement with the lower stationary contacts, for reception of the special program in its inferior aesthetic quality. The right-hand stationary contact of each of the units 148, 149 and 150 connects to the corresponding control line 182, 183 or 184, as the case may be, and the left-hand stationary contact of each of the units 148, 149 and 150 connects to the solenoid of the corresponding unit 142, 143 or 144, as the case may be. The tip contact of each of the left-hand plugs remains dead while such plug remains in partially inserted condition. When it is desired to produce superior aesthetic quality reception, the plug is fully inserted, thus bringing the tip into engagement with the lower plate 123[a] or 123[b] or 123[c], as the case may be, and applying control potential to the line 188′, 189′ or 190′, as the case may be. Such lines 188, 189 and 190 connect to the solenoids 191, 192 and 193, respectively, of the units 148, 149 and 150, thus terminating, for the time being, the activations of the units 142, 143 or 144, as the case may be, and permitting the translation of the raster to be in full color. The foregoing operations are substantially the same as explained in connection with the showings of FIGURES 1 and 2.

The pre-pay or token operated units 194, 195 and 196 may be provided for the corresponding receivers, located conveniently accessible for coin or token insertions when desired. The contacts of these units are normally open as shown in FIGURE 10. One contact of each of these units connects to the upper wiper of the corresponding rotary contact element 133, 134 or 135, as the case may be so that such upper contact of the pre-pay unit is electrified by control current from the sending station then tuned, provided that such sending station is then emitting a special program, including its control signal, to the control station. The other contact of such unit connects by a line 197, 198 or 199 to the line 188', 189' or 190', which connects to the solenoid 191, 192 or 193, as the case may be, thus producing the translation in full color by a manual operation at the location of the receiver instead of by operation produced by the attendant.

The R.F. input switches 185, 186 and 187 are retained normally in their raised positions against their upper contacts by light springs 200, 201 and 202; such upper contacts connecting to the top contacts of the right-hand plugs 1, 2 and 3, by the lines 203, 204 and 205, respectively. Accordingly, insertion of each of such plugs into its corresponding socket plate 124, delivers broadcast signals to the corresponding receiver.

The upper plate of such socket unit 124, is grounded. Accordingly, the sleeve of each plug which may be inserted into such socket unit will be grounded. The lines 206, 207 and 208 connect to such sleeves. Such ground lines 206, 207 and 208 are individual to their respective receivers; and various of the return sides of units of the receivers are connected to such ground lines. It is unnecessary to recite all of these connections in detail; but I have, in FIGURE 10, also shown a line 209 or 210 or 211, as the case may be, also connected to such ground line of each receiver; such lines 209, 210 and 211 showing symbolically that, if desired the return lines of the receivers may also be grounded by insertion of the plugs, corresponding to such receivers.

It is noted that with the arrangement shown in FIGURE 2, wherein the upper plate of the socket unit shown in FIGURE 3 (as a substitute for the showing of FIGURE 2), is connected to the incoming control line 26 from the sending station A, the only sending station served by such modified unit of FIGURE 3 is the sending station A; it being noted however, that insertion of such plug into such unit of FIGURE 3, will enable reception of broadcast programs from any one of the several broadcasting stations then on the air. To make such arrangement of FIGURE 2 applicable for testing the other sending stations than station A, to see whether special programs are, at the time being emitted by the other sending stations. Further provisions respecting the functions of such unit shown in FIGURE 3 may be required. In the arrangement shown in FIGURE 10, it is possible to test the availability of special programs being emitted by any of stations A, B or C.

In FIGURE 10 I have shown by the dashed lines 212 and 213 at the sending station "C," lines corresponding to the lines 105–106 of FIGURE 2, enabling the reception at such sending station, of programs received from another sending station, and retransmitting such received programs from such sending station "C" by "non-accessible" transmission lines, such as co-axial cable. Thus, such sending station "C" would correspond, in principle, to the basic operations performed by a conventional CATV operation. I have also included the switch 214 in such connections 212 and 213, to enable operation of such sending station, either from programs originated at such sending station "C", or programs retransmitted by such sending station.

I have previously herein referred to the provision of means to emit the program either with commercials or without commercials. In the latter case certain time intervals, otherwise consumed by the commercials, may be made available for enlargement of announcements relating to the subject-matter of the program, or for other announcements, non-commercial in character, properly related to the program itself. In FIGURE 13 I have shown, by diagram, a typical relationship of the time intervals for rendition of the selected program, during a stated time interval, under the inferior quality rendition, as compared to rendition of that program, during the same time interval, under the superior quality rendition. The "Conventional" rendition is shown by the time zone 127', and the superior rendition by the time zone 128', both of such time zones commencing at the time line 129', and both terminating at the time line 130'. If such program be the rendition of a play, for example, the commercials injected into the conventional rendition may be as indicated by the interruptions C, and acts of the play being as shown by the identifications 1, 2, and 3; and the subscription of Pay-T.V. rendition may include the explanations of the play acts to follow, as indicated by the time elements E, the play now being rendered with the four acts, identified as 1, 2, 3, and 4, respectively; but the overall time assignments are the same for both renditions.

The pay or subscription receivers, may receive the program in either the interior aesthetic quality rendition or in the superior aesthetic quality renditions; and in either case such rendition will be without the commercials, possibly with some increase in the time devoted to announcements relating to the play or other program being emitted. In any case, however, the pay or subscription receivers are able to gain the benefit of elimination of the commercials, whether the subscriber avails himself of the ability to obtain the superior quality rendition, without program pay, or decides to make program pay, thus obtaining redition, not only in the superior aesthetic quality rendition, but also without the commercials.

I claim:

1. A television system including means constituted to emit and deliver program signals, including video signals translatable to produce intelligible picture translations of a program in either an inferior or a superior aesthetic quality, emitted by sending station equipment through two transmission media including a first defined broadcasting medium and a second defined non-broadcasting medium, wherein the video signals received through the first defined broadcasting medium are translatable for production of an intelligible raster of the aesthetic quality corresponding to said signals, and wherein the video signals received through the second defined non-broadcasting medium are translatable for production of an intelligible raster in either the inferior or the superior aesthetic quality; a plurality of receivers each including means constituted to receive and translate video signals corresponding to the superior aesthetic quality, including means to produce a raster of either the inferior or the superior aesthetic quality, and including means to select the aesthetic quality of the raster produced from such signals; each of said receivers including selecting means constituted to deliver either the received broadcast signals or the received non-broadcast signals, to the radio frequency input element of such receiver; a control station including means constituted to select the delivery of either the broadcast or the non-broadcast signals to such input element of each receiver; means to deliver a control signal from such sending station to the control station when a program of video signals is being emitted by such sending station; and means operable by the control station attendant, in connection with the control station, constituted to deliver control potential corresponding to such control signal, to each receiver.

2. A television system as defined in claim 1, wherein the intelligible raster of inferior aesthetic quality is a raster in monochrome, and wherein the intelligible raster of superior aesthetic quality is a raster in color.

3. A television system as defined in claim 1; wherein the means in each receiver which selects translation of the video signals for production of the raster in a selected aesthetic quality, includes control signal activated means; together with control station operator activating means constituted to cause the control signal potential delivered to each receiver, to select the aesthetic quality raster translation produced by such receiver.

4. A television system as defined in claim 3; wherein each receiver includes control signal actuated means constituted to cause such receiver to produce the translation of the video signals for production of the raster of inferior aesthetic quality when the means which selects the delivery of received video signals to the video signal input element of such receiver, selects the non-broadcast signals; together with control station operator activated means, constituted to cause translation of the video signals so delivered to the receiver video signal input element, for production of the raster in the superior aesthetic quality.

5. A television system as defined in claim 3; wherein each receiver includes control signal actuated means constituted to cause such receiver to produce the translation of the video signals for production of the raster of inferior aesthetic quality when the means which selects the delivery of received video signals to the video signal input element of such receiver, selects the non-broadcast signals; together with receiver operated activated means, constituted to cause translation of the video signals so delivered to the receiver video signal input element, for production of the raster in the superior aesthetic quality.

6. A television system as defined in claim 5; wherein the receiver operated activated means which causes translation of the video signals for production of the raster in the superior aesthetic quality, comprises coin or token operated means.

7. A television system as defined in claim 1; wherein there is a plurailty of sending stations each including equipment constituted to emit and deliver video signals through the first defined broadcasting medium and to emit and deliver video signals through a non-broadcasting medium; wherein the carrier wave frequencies emitted by each sending station through such broadcasting and non-broadcasing media, are the same, and wherein the carrier wave frequencies emitted by each sending station are different from the carrier wave frequencies of the other sending stations; and wherein each receiver is constituted to select and receive and translate the video signals of a plurality of such frequencies; means to emit a control signal from each sending station to the control station; each control station including means constituted to select the delivery to the video input element of each receiver, either the broadcast or the non-broadcast video signals of any such carrier wave frequency; together with means and connections to deliver to each receiver a control potential corresponding to each of the control signals received from a sending station.

8. A television system as defined in claim 7, together with signal means in connection with each receiver, and user operated sending station selecting means in connection with each receiver, including movable tuning means having positions corresponding to different carrier wave frequencies tuned; and means and connections between each of the receiver tuning positions and the signal means of such receiver, to the control potential delivering means for the sending station corresponding to each of the tuning positions, constituted to activate the signal means of each receiver when the movable tuning means of such receiver is in position corresponding to the carrier wave frequency of a sending station which is emitting program signals and a corresponding control signal.

9. A television system as defined in claim 8; together with signal means in the control station for each of the sending stations, including a group of signal elements identified with each sending station and including signal elements corresponding to each of the receivers; together with means and connections between the control potential delivering means which corresponds to each sending station, and the movable tuning element of each of the receivers, and between the tuning positions of such movable tuning elements and the signal elements corresponding to the sending stations tuned at such tuning positions, constituted to activate the signal element for the control station, which corresponds to an identified receiver when the movable tuning element of such receiver is in position to tune video signals being delivered from the sending station corresponding to the position of such movable tuning element and when said sending station is emitting its control signal to such control station.

10. A television system as defined in claim 9; together with means in connection with the movable tuning element of each of the receivers, constituted to cause the current flow from such movable tuning element to produce activation of the control station signal element under a first defined signalling strength; and user operated means constituted to cause said current flow from such movable tuning element to produce activation of the control station signal element under a second defined signalling strength.

11. A television system including means constituted to emit and deliver program signals, including video signals translatable to produce intelligible picture translations of a program in either an inferior or a superior aesthetic quality, emitted by sending station equipment through two transmission media including a first defined broadcasting medium and a second defined non-broadcasting medium, wherein the video signals received through the first defined broadcasting medium are translatable for production of an intelligible raster of the aesthetic quality corresponding to said signals, and wherein the video signals received through the second defined non-broadcasting medium are translatable for production of an intelligible raster in either the inferior or the superior aesthetic quality; a plurality of receivers each including means constituted to receive and translate video signals corresponding to the superior aesthetic quality, including means to produce a raster of either the inferior or the superior aesthetic quality, and including means to select the aesthetic quality of the raster produced from such signals; each of said receivers including selecting means constituted to deliver either the received broadcast signals or the received non-broadcast signals, to the radio frequency input element of such receiver; a control station including means constituted to select the delivery of either the broadcast or the non-broadcast signals to such input element of each receiver; means to deliver a control signal from such sending station to the control station when a program of video signals is being emitted by such sending station and is being transmitted to the control station; and means constituted to deliver control potential corresponding to such control signal to each of said receivers.

12. A television system as defined in claim 11; wherein there is provided first defined control station video signal input control switch means constituted when in a first defined switch position to engage a first defined broadcast video signal contact, and when in a second defined position to engage a non-broadcast video signal contact; spring means urging such switch means to engage said broadcast signal contact; and a broadcast video signal receiving antenna; together with second defined control station video signal input attendant-controlled switch means including an element in connection with said antenna; and a movable switch contact in connection with the broadcast video signal contact, and engageable with the element which is in connection with the antenna for supply of broadcast video signals to the second defined broadcast video signal contact of the video signal input control switch means, under control of the control station attendant.

13. A television system as defined in claim 12; including attendant-controlled means which is constituted to deliver control potential corresponding to the control signal, to each receiver, comprises third defined switch means including an element in connection with the control signal delivering means, and includes an attendant-operated contact corresponding to each receiver and engageable with said element which is in connection with the sending station control delivering means, and comprises a portion of the means which is constituted to deliver control potential to such receiver.

14. A television system as defined in claim 13; wherein the attendant-operated contact for each receiver and which comprises a portion of the means which is constituted to deliver control potential to such receiver, and the switch element which is in connection with the antenna, are ganged together; and wherein the element which is in connection with the means which delivers the control signal from the sending station to the control station, and the movable switch contact which is in connection with the broadcast video contact for such receiver, are ganged together.

15. A television system as defined in claim 12; wherein there is a plurality of sending stations each as defined in said claim; each such sending station being constituted to emit the signals intelligibly translatable for production of a program in either an inferior or a superior aesthetic quality, and each of such sending stations emitting its signals on a carrier wave frequency individual to such sending station; and wherein each of the receivers includes a multi-position program selecting means having positions corresponding to tuning the several carrier wave frequencies; together with a control signal connection from each sending station to the control station, and a control potential line from such control station corresponding to each of the sending station control signal connections to the control station; a signal element in connection with each receiver; and means in connection with the multi-position program selecting means and the signal element of such receiver, constituted to connect the signal element of such receiver to the control potential line of such receiver, corresponding to the tuned position of the multi-position program selecting means.

16. A television system as defined in claim 15; wherein the control potential which is delivered to each of the receivers delivers control current for activation of the means to cause production of either the inferior aesthetic quality program or the superior aesthetic quality program, and delivers control current to the means to select the aesthetic quality of the produced program, and delivers a control current to the means which is constituted to deliver either the received broadcast signal or the received non-broadcast signal, to the radio frequency input element of the receiver, and the signal element of such receiver; connects to a common return line for the current supplied to said elements from the control potential of such receiver; together with attendant-controlled two position switch means in connection with the common return line of such receiver, said switch means having a first defined open switch position and a second defined closed switch position; wherein said common return line is grounded to complete the circuit back to the source of potential when the switch is in its second defined position.

17. A television system emitting, transmission, and receiving and translating program system, wherein the signals are translatable to produce an intelligible translation in a selected one of a plurality of aesthetic qualities; comprising in combination sending equipment, a plurality of receivers, and a control station; said sending equipment including means constituted to emit program signals for said program translatable in either an inferior or a superior aesthetic quality; means to emit and transmit said first defined program signals by a first defined transmission medium, and to emit and transmit said second defined program signals by a second defined transmission medium; means in connection with the control station constituted to receive the second defined program signals from the second defined transmission medium; the receivers including non-pay or non-subscription receivers and pay or subscription receivers; the non-pay or non-subscription receivers being constituted to receive and intelligibly translate program signals transmitted over said first defined transmission medium for a program of the aesthetic quality corresponding to said signals, and the pay or subscription receivers being constituted to receive and intelligibly translate program signals transmitted over said second defined transmission medium for production of a program translation in either the first defined inferior aesthetic quality, or the second defined superior aesthetic quality.

18. A pay or subscription television system comprising in combination; means to produce and emit a program comprising video signals and audio signals; wherein the video signals are translatable to produce a raster in either first defined color or second defined monochrome translation, and wherein the audio signals are translatable for production of either a sound component of said program signals as a first defined sound component of the program which first defined sound component includes only sound information relative to the color program translation, or a second defined sound component of the program which second defined sound component includes commercial anouncements unrelated to such monochrome program translation; together with a plurality of pay or subscription receivers and a plurality of non-pay or non-subscription receivers; wherein the non-pay or non-subscription receivers are constituted to receive and translate the second defined monochrome raster and to receive and translate the second defined sound component, and wherein the pay or subscription receivers are constituted to receive and translate the first defined color raster and to receive and translate the first defined sound component.

19. A pay or subscription television system as defined in claim 18; wherein the pay or subscription receivers are constituted to receive and translate either the first defined color video signals and the first defined audio signals, or the second defined monochrome video signals and the first defined audio signals, selectively.

20. A pay or subscription television system as defined in claim 19; together with means in connection with each of the pay or subscription receivers constituted to select either the first defined video signals translation and the first defined audio signals translation, or the second defined video signals translation and the first defined audio signals translation; and operator controlled means constituted to select either the first defined video signals and audio signals translation; or the second defined video signals and audio signals translation.

21. A pay or subscription television system comprising in combination: means to produce and emit a program comprising video signals and audio signals; wherein the video signals are translatable to produce a raster in either a first-defined-quality-video entertainment translation, or to produce said raster in a second-defined-quality-video entertainment translation, or to produce said raster in a third defined video entertainment and commercial announcements translation; and wherein the audio signals are translatable for production of either a first-defined-sound component of said program, which component includes only sound information relative to the entertainment of the first-defined-quality video-signals-entertainment translation and to the entertainment of the second-defined-quality video-signals-entertainment translation, and a second-defined-sound component of said program, which includes audible commercial announcements; together with a plurality of non-pay or non-subscription receivers and a plurality of pay or subscription receivers; wherein the non-pay or non-subscription receivers are constituted to receive and translate the third defined video entertainment and commercial announcements translation, and to receive and translate the second defined sound component of the program; and wherein the pay or subscription receivers are constituted to receive and translate the first-defined-quality video entertainment translation and the first defined sound component, or to receive and translate the second-defined-quality video entertainment translation and the first defined sound component, of the program, selectively.

22. A pay or subscription television system as defined in claim 21; wherein the first-defined-quality-video entertainment translation raster is a monochrome raster translation, and wherein the second-defined-quality-video entertainment translation raster is a color raster translation.

23. A pay or subscription television system as defined in claim 22; wherein the third-defined-video and entertainment and commercial announcements translation raster is a monochrome raster translation.

24. A pay or subscription television system as defined in claim 21; together with operator controlled means to select either the first-defined-quality-video entertainment translation or the second-defined-quality-video entertainment translation.

25. A pay or subscription television system as defined in claim 21; together with operator controlled means to select either the first-defined-quality-video entertainment translation or the second-defined-quality-video entertainment translation; wherein the first-defined-quality-video entertainment translation is a monochrome translation, and the second-defined-quality-video translation is a color translation.

26. A pay or subscription television system as defined in claim 25; wherein the means to select the second-defined-quality-video entertainment translation comprises a pre-pay unit.

27. A pay or subscription television system as defined in claim 25; wherein the means to select the second-defined-quality-video entertainment translation comprises a remote control unit.

28. A two quality television system comprising in combination, means to produce and emit a program comprising video signals and audio signals; wherein the video signals are translatable to produce a raster in either a first defined superior aesthetic quality intelligible translation, or a second defined inferior aesthetic quality intelligible translation, and wherein the audio signals are translatable for production of either a first defined sound component of said program, which sound component includes only sound information relative to the superior aesthetic quality raster program translation, or for production of a second defined sound component of said program, which sound component includes commercial announcements unrelated to the inferior aesthetic quality raster program translation; together with a first group of television receivers constituted to receive and translate the first defined superior aesthetic quality video signals raster producing component and the first defined audio signals sound producing component, and a second group of television receivers constituted to receive and translate the second defined inferior aesthetic quality video signals raster producing component and the second defined audio signals sound producing component concurrently with the reception and translation of the first defined video signals and the first defined audio signals components.

29. A two quality television system as defined in claim 28; wherein the receivers of the first group comprise pay or subscription receivers, and the receivers of the second group comprise non-pay or non-subscription receivers.

30. A two quality television system as defined in claim 29; together with means in connection with each pay or subscription receiver, constituted to make effective or ineffective such receiver for translation of the video signals translating means to produce the raster in said superior aesthetic quality, and to make effective or ineffective the first defined audio signals sound producing component.

31. A two quality television system as defined in claim 30, wherein said ineffective or effective making means comprises pre-pay coin or token means.

32. A two quality television system as defined in claim 30; wherein said ineffective or effective making means comprises a remote control means.

33. A two-quality television system as defined in claim 28; wherein the means to produce and emit a program comprising video signals and audio signals, comprises a CATV station.

34. A television system including means constituted to emit and deliver program signals, including video signals translatable to produce intelligible picture translations of a program in either an inferior or a superior aesthetic quality, emitted by sending station equipment through two translation media including a first defined broadcasting medium and a second defined non-broadcasting medium, wherein the video signals received through the first defined broadcasting medium are translatable for production of an intelligible raster of the aesthetic quality corresponding to said signals, and wherein the video signals received through the second-defined non-broadcasting medium are translatable for production of an intelligible raster in either the inferior or the superior aesthetic quality; a plurality of receivers each including means constituted to receive and translate video signals corresponding to the superior aesthetic quality, including means to produce a raster of either the inferior or the superior aesthetic quality, and including means to select the aesthetic quality of the raster produced from such signals; each of said receivers including selecting means constituted to deliver either the received broadcast signals or the received non-broadcast signals.

35. A television system as defined in claim 34; wherein the means to deliver the program signals includes CATV sending station means.

36. A television system as defined in claim 35; wherein the CATV sending station means includes program broadcasting means delivering the program to the broadcasting medium, and also includes non-broadcasting means delivering the program to the non-broadcasting medium.

37. A television system as defined in claim 34; wherein the sending station equipment includes a sending station constituted for delivering the program broadcast through the broadcasting medium and for delivering the program non-broadcast through the non-broadcasting medium.

38. A television system as defined in claim 34; wherein the sending station equipment includes a sending station constituted to emit the program signals in quality for translation according to both the first defined aesthetic quality or according to the second defined aesthetic quality.

39. A television system as defined in claim 3; wherein the sending station is a CATV station.

References Cited

UNITED STATES PATENTS

| | | | |
|---|---|---|---|
| 2,031,075 | 2/1936 | Scheibell. | |
| 3,366,731 | 1/1968 | Wallerstein | 178—5.1 |

ROBERT L. GRIFFIN, Primary Examiner

HOWARD W. BRITTON, Assistant Examiner

U.S. Cl. X.R.

178—5.1, 6